United States Patent
Chien

(10) Patent No.: US 7,554,677 B2
(45) Date of Patent: Jun. 30, 2009

(54) OPTICAL MEASURING DEVICE FOR MEASURING MICRO DISPLACEMENT OR MICRO VIBRATION OF OBJECT

(75) Inventor: Yang-Chang Chien, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 133 days.

(21) Appl. No.: 11/309,625

(22) Filed: Sep. 1, 2006

(65) Prior Publication Data

US 2007/0127038 A1    Jun. 7, 2007

(30) Foreign Application Priority Data

Dec. 2, 2005    (CN) .................. 2005 1 0101994

(51) Int. Cl.
*G01B 11/14*    (2006.01)
(52) U.S. Cl. ....................... 356/614; 356/622
(58) Field of Classification Search .......... 356/614–623
See application file for complete search history.

(56) References Cited

U.S. PATENT DOCUMENTS

| | | | | |
|---|---|---|---|---|
| 4,564,757 A | * | 1/1986 | LaBudde et al. | ............ 250/239 |
| 4,828,390 A | * | 5/1989 | Miyoshi | ...................... 356/624 |
| 5,691,725 A | * | 11/1997 | Tanaka | ........................ 342/126 |
| 6,674,521 B1 | * | 1/2004 | Segall et al. | ................. 356/150 |
| 7,327,474 B2 | * | 2/2008 | Chien | .......................... 356/614 |
| 2004/0024563 A1 | * | 2/2004 | Vogler et al. | ................. 702/150 |
| 2005/0162662 A1 | * | 7/2005 | Sauerland et al. | ........... 356/502 |

* cited by examiner

*Primary Examiner*—Hoa Q Pham
(74) *Attorney, Agent, or Firm*—Steven M. Reiss

(57) ABSTRACT

An optical measuring device (20) for measuring a micro displacement or a micro vibration of an object (28) includes a laser emitter (21), an amplifying lens module (23), and a photoelectric sensor (25). The laser emitter is configured for emitting a laser beam at the object so that the object reflects the laser beam and forms a beam reflection. The amplifying lens module is disposed between the photoelectric sensor and the object for the beam reflection passing there through. The amplifying lens module has an optical axis parallel to the beam reflection. The photoelectric sensor includes a receiving plane (251) for perpendicularly receiving the beam reflection reflected by the object.

7 Claims, 3 Drawing Sheets

OPTICAL MEASURING DEVICE FOR MEASURING MICRO DISPLACEMENT OR MICRO VIBRATION OF OBJECT

FIELD OF THE INVENTION

The present invention generally relates to measuring devices and, more particularly, to an optical measuring device for measuring a displacement or vibration of an object.

DISCUSSION OF THE RELATED ART

With the constant miniaturization of consumer electronic products, manufacturing micro-components used in such consumer electronic products becomes smaller and smaller, thus a precision for measuring a micro displacement or vibration of the micro-components has also increased. As a measuring precision accuracy required in the manufacturing of consumer electronic products needs to be more and more detailed, the importance for measuring a displacement or a vibration of the micro components used in such electronic products is also increased.

Referring to FIG. 1, a typical optical measuring device 10 is generally used for measuring objects such as micro-components is described. The optical measuring device 10 includes a laser emitter 11 and a photoelectric sensor 15. The laser emitter 11 is configured for emitting a laser beam 111 onto an object 18. The photoelectric sensor 15 is board-shaped and has a receiving surface 151 comprising a plurality of photosensitive cells in a matrix manner. The receiving surface 151 is configured for receiving a laser beam reflection 112 reflected by the object 18. When the optical measuring device 10 is used for measuring a displacement of the object 18, the laser emitter 11 emits the laser beam 111 onto the object 18 at an angle of θ. The laser beam 111 is then reflected towards the photoelectric sensor 15 by the object 18. The photoelectric sensor 15 is configured to receive the laser beam reflection 112 perpendicularly.

If the object 18 is displaced from a first position A1 to a second position A2, the laser beam reflection 112 reflected by the object 18 at different positions will be received by different photosensitive cells of the photoelectric sensor 15. According to trigonometry relations and the trigonometric functions as follow, $X = L \times \sin\theta$, $D = L \times \sin 2\theta$, thus $D_1 X = (L \times \sin 2\theta)/(L \times \sin\theta) = \sin 2\theta / \sin\theta = 2\cos\theta$.

Wherein, X represents a displacement value of the object 18 from the first position A1 to the second position A2, D represents a displacement value of the laser beam reflection 112 incidence along the photoelectric sensor 15, and L represents a light projecting distance between the first position A1 and the second position A2. The displacement value D is detected by the photoelectric sensor 15, therefore, the displacement value X can be calculated by the above formulas.

However, the measuring precision of the optical measuring device 10 is dependant by the resolution of the photoelectric sensor 15. The higher the resolution of the resolution of the photoelectric sensor 15, the higher the measuring precision of the optical measuring device 10, i.e. the optical measuring device 10 is able to measure a smaller displacement value D. If a higher measuring precision is required, the photoelectric sensor 15 will need to be of a higher resolution. In order to improve the resolution of photoelectric sensor 15, the photoelectric sensor 15 should comprise a plurality of smaller photosensitive cells. Generally, it is difficult to manufacture the smaller photosensitive cells, thus the cost of manufacturing a photoelectric sensor 15 with higher resolution will be increased. In addition, if the displacement value D is small, the photoelectric sensor 15 for measuring such a small value D must have a higher resolution. If the resolution of the photoelectric sensor 15 is not high enough for measuring such small displacement value D, the displacement value D cannot be measured. In other words, the typical measuring precision of the optical measuring device 10 is not accurate enough for measuring a micro displacement value.

What is need, therefore, is an optical measuring device for measuring a micro displacement or vibration of objects, and can achieve high measuring precision.

SUMMARY

In one preferred embodiment thereof, an optical measuring device for measuring a micro displacement or a micro vibration of an object includes a laser emitter, an amplifying lens module, and a photoelectric sensor. The laser emitter is configured for emitting a laser beam at the object so that the object reflects the laser beam and forms a beam reflection. The amplifying lens module is disposed between the photoelectric sensor and the object for the beam reflection passing there through. The amplifying lens module has an optical axis parallel to the beam reflection. The photoelectric sensor includes a receiving plane for perpendicularly receiving the beam reflection reflected by the object.

Other advantages and novel features of a preferred embodiment of the present optical measuring device and its applications will become more apparent from the following detailed description when taken in conjunction with the accompanying drawings.

BRIEF DESCRIPTION OF THE DRAWINGS

Many aspects of the optical measuring device and their applications can be better understood with reference to the following drawings. The components in the drawings are not necessarily drawn to scale, the emphasis instead being placed upon clearly illustrating the principles of the optical measuring device. Moreover, in the drawings, like reference numerals designate corresponding parts throughout the several views.

DETAILED DESCRIPTION OF PREFERRED EMBODIMENTS

Figure 1:
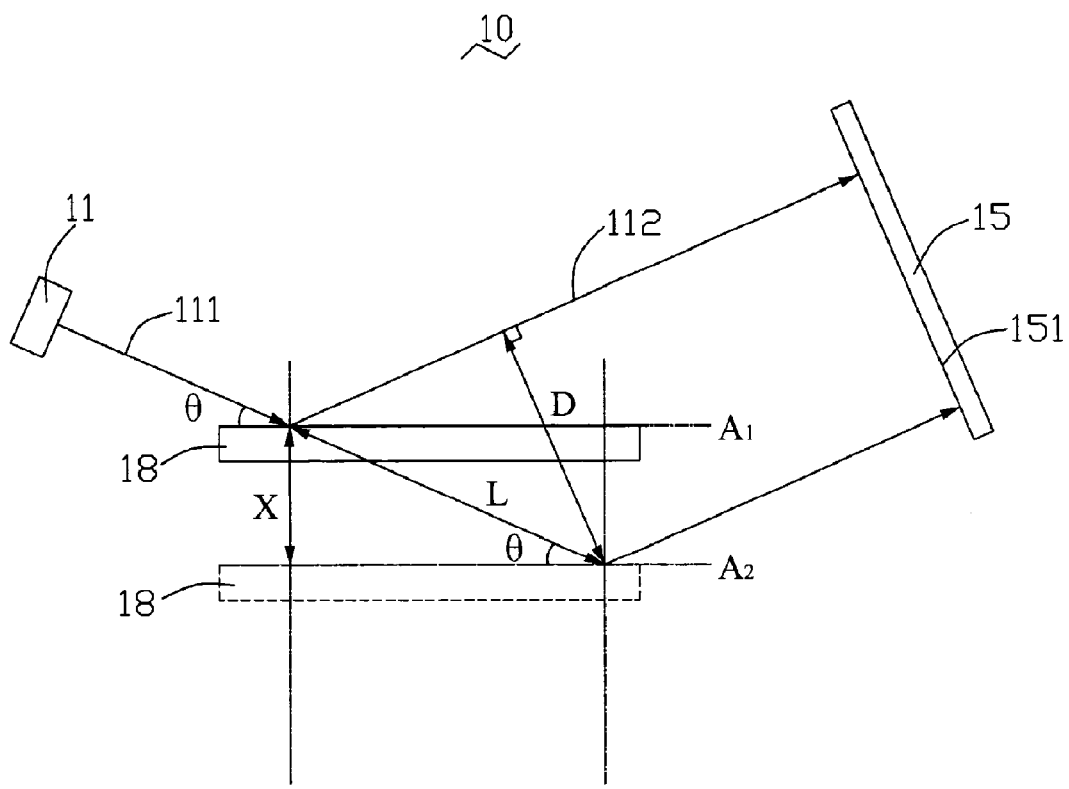
FIG. 1 is a schematic view of a typical optical measuring device, and showing laser beams passing through the optical measuring device.
Figure 2:
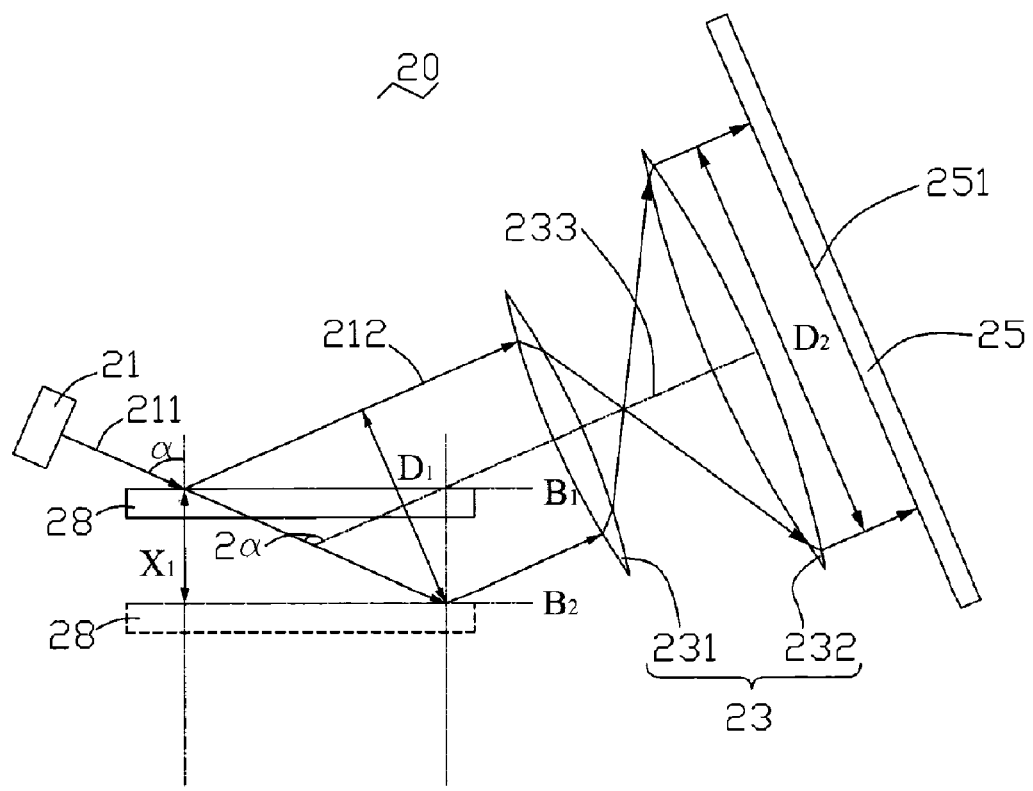
FIG. 2 is a schematic view of an optical measuring device in accordance with a preferred embodiment of the present invention, and showing laser beams passing through the optical measuring device.

Referring to FIG. 2, in a preferred embodiment, an optical measuring device 20 includes a laser emitter 21, an amplifying lens module 23, and a photoelectric sensor 25. The optical measuring device 20 is used for measuring a displacement or a vibration of objects such as micro components used in electronic products.

The laser emitter 21 is disposed adjacent to an object 28 and is used for emitting a laser beam 211 at the object 28. The laser beam 211 is emitted on the object 28 at an incidence angle α. The object 28 reflects the laser beam 211 so as to form a beam reflection 212. In this embodiment, the laser emitter 12 is a laser diode. The amplifying lens module 23 is disposed adjacent to the object 28, and the lens module 23 is configured for receiving the beam reflection 212 perpendicularly. The lens module 23 has an optical axis 233, and an angle between the optical axis 233 and the laser beam 211 is $2\alpha$, thus the optical axis 233 is parallel to the beam reflection 212.

Figure 3:
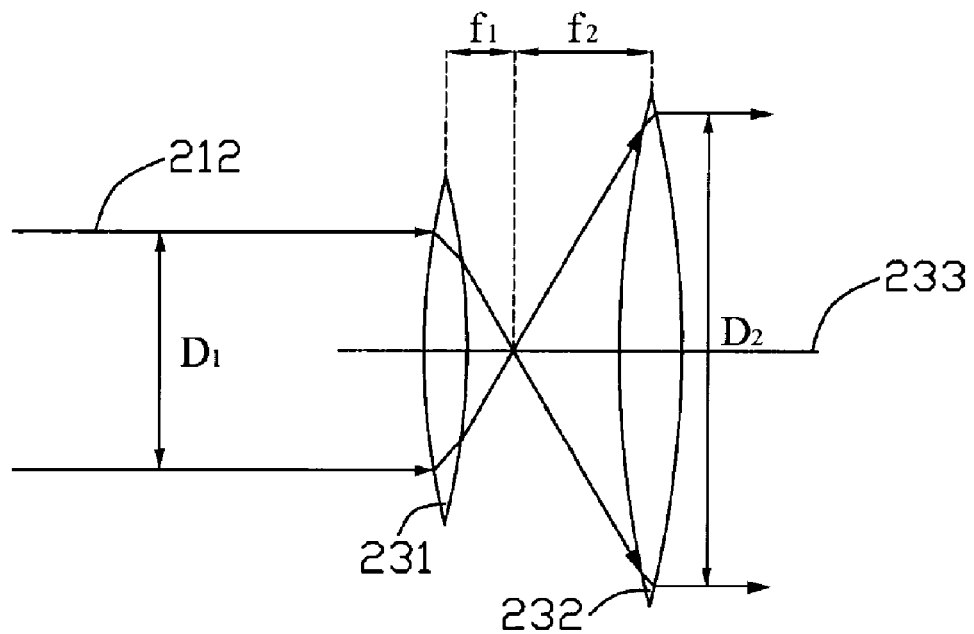
FIG. 3 is a schematic view of a amplifying lens module shown in FIG. 2, and showing laser beams passing through the amplifying lens module.

Referring also to FIG. 3, the lens module 23 includes a first lens 231 and a second lens 232. The first lens 231 and the second lens 232 are both convex lenses. The first lens 231 and the second lens 232 are disposed in a way such that focal lines of both the first lens 231 and the second lens 232 lie on the same line as the optical axis 233. A focal length $f_1$ of the first lens 231 is smaller than a focal length $f_2$ of the second lens 232. A distance between the first lens 231 and the second lens 232 is equal to a sum of the focal length $f_1$ and the focal length $f_2$. The beam reflection 212 passes through the first lens 231 and the second lens 232 respectively.

The photoelectric sensor 25 is board-shaped and includes a receiving plane 251 comprising a plurality of photosensitive cells in a matrix manner. The receiving plane 251 is configured for receiving the beam reflection 212 reflected by the object 28 perpendicularly. In this embodiment, the photoelectric sensor 25 is a charge coupled device (CCD) or a complementary metal-oxide semiconductor (CMOS).

In use, when the object 28 displaces from a first position B1 to a second position B2, the beam reflections 212 reflected by the object 28 at different positions are received by different photosensitive cells of the photoelectric sensor 25. According to trigonometry relations and the trigonometric functions as follow, $D_1/X_1 = 2\cos(90°-\alpha) = 2\sin\alpha$,
$D_1 = 2X_1 \sin\alpha$.

Wherein, $X_1$ represents a displacement value of the object 28 from first position B1 to the second position B2, $D_1$ represents a displacement value of the beam reflections 212 along the first lens 231.

When the beam reflections 212 passes through the second lens 232 and is received by the photoelectric sensor 25, if $D_2$ represents a displacement value of the beam reflections 212 along the photoelectric sensor 25, then, $D_2 = D_1 \times f_1/f_2$, namely,
$D_2 = 2X_1 \sin\alpha \times f_1/f_2$, thus
$X_1 = (D_2/2\sin\alpha) \times f_2/f_1$.

Since the displacement value $D_2$ is detected by the photoelectric sensor 25, hence, the displacement value $X_1$ can be calculated by using the above formulas. This is because the focal length f2 of the second lens 232 is larger than focal length f1 of the first lens 231, thus $D_2$ is larger than $D_1$. In addition, the measuring precision of the optical measuring device 20 is dependant on both the resolution of the photoelectric sensor 25 and the lens module 23. Since the displacement value $D_1$ can be magnified by the amplifying lens module 23, therefore, the optical measuring device 20 can also achieve a higher measuring precision than the typical optical measuring device 10 without improving the resolution of the photoelectric sensor 25.

In the alternative embodiment, the first lens is a concave lens and the second lens is convex lens. The first lens and the second lens are disposed in a way such that focal lines of both the first lens and the second lens lie on the same line as the optical axis. The focal length of the second lens is larger than the focal length of the first lens. A distance between the first lens and the second lens is equal to the difference of the focal length of the second lens and the focal length of the first lens.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical measuring device for measuring a micro displacement or a micro vibration of an object, comprising:
   a laser emitter configured for emitting a laser beam at the object so that the object reflects the laser beam and forms a beam reflection;
   a photoelectric sensor including a receiving plane for perpendicularly receiving the beam reflection; and
   an amplifying lens module disposed between the photoelectric sensor and the object being measured, wherein the amplifying lens module has an optical axis, and the beam reflections before the amplifying lens module and after the amplifying lens module are parallel to the optical axis and each other.

2. The optical measuring device as claimed in claim 1, wherein the laser emitter is a laser diode.

3. The optical measuring device as claimed in claim 1, where the photoelectric sensor is a charge coupled device.

4. The optical measuring device as claimed in claim 1, wherein the photoelectric sensor is a complementary metal-oxide semiconductor.

5. The optical measuring device as claimed in claim 1, wherein the receiving plane is formed with a plurality of photosensitive cells in a matrix manner.

6. The optical measuring device as claimed in claim 1, wherein the lens module a first convex lens adjacent to the object and a second convex lens adjacent to the photoelectric sensor, the first convex lens and the second convex lens are disposed in a way such that focal lines of both the convex first lens and the second convex lens lie on the same line as the optical axis, the focal length of the first convex lens is smaller than that of the second convex lens, and a distance between the first lens and the second lens is equal to the total of the focal length of the two convex lenses.

7. The optical measuring device as claimed in claim 1, wherein the lens module includes a concave lens adjacent to the object and a convex lens adjacent to the photoelectric sensor, the concave lens and the convex lens are disposed in a way such that focal lines of both the concave and the convex lens lie on the same line as the optical axis, the focal length of the convex lens is larger than that of the concave lens, a distance between the concave lens and the convex lines is equal to the difference of the focal length of the convex lens and that of the concave lens.

* * * * *